I. DeV. WARNER.

Corset.

No. 8,114. Reissued March 5, 1878.

Attest:

Fr. Benjamin

Edwd. A. Welsh

Inventor

I. DeVer Warner

By his attorney

Charles E. Foster

N. PETERS, PHOTO-LITHOGRAPHER, WASHINGTON, D. C.

UNITED STATES PATENT OFFICE.

IRA DE VER WARNER, OF BRIDGEPORT, CONNECTICUT.

IMPROVEMENT IN CORSETS.

Specification forming part of Letters Patent No. 189,405, dated April 10, 1877; Reissue No. 8,114, dated March 5, 1878; application filed February 8, 1878.

*To all whom it may concern:*

Be it known that I, IRA DE VER WARNER, of Bridgeport, Fairfield county, Connecticut, have invented an Improvement in the Manufacture of Corsets, of which the following is a specification:

The object of my invention is to manufacture a corset so as to secure the requisite stiffness and elasticity, prevent the ribs from being thrust through the cloth or from changing their position, and to produce a corset which will preserve its shape.

Figure 1:
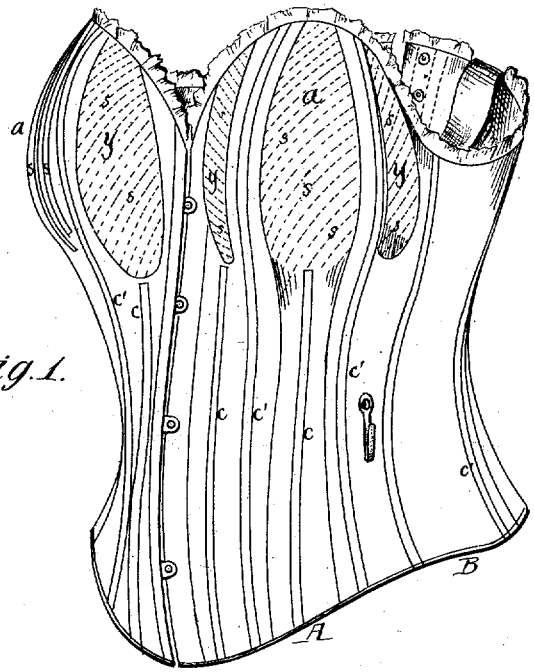
Figure 2:
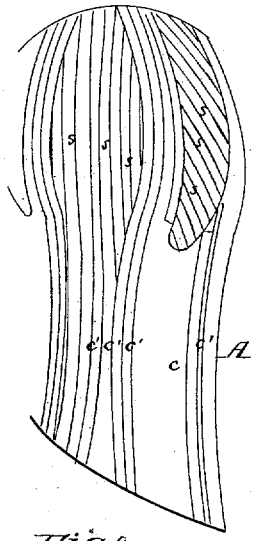
Figure 3:
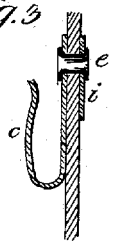

In the drawing, Figure 1 is an external perspective view of a corset illustrating my improvement; Fig. 2, a face view of part of the corset, and Fig. 3 a detached sectional view.

The corset is made of sections, forming together the front pieces A and back pieces B, and the breast-receptacles or bosom-pads *a a* are made by properly shaping the upper ends of the sections composing the front pieces, or by the insertion of gores *y*, or by combining one or more long central strips of the proper shape and short side gores, as shown, the peculiar mode of cutting or arranging the sections to obtain the requisite shape constituting no part of this improvement.

Instead of forming continuous longitudinal pockets for the reception of the bones, and imparting lateral rigidity to the breast-receptacles wholly by cross-bones arranged within the same, as heretofore, I stiffen the upper widened portions of the sections or the gores, or both, by means of small ribs secured in series of pockets *s s*, placed side by side or parallel, and extending diagonally, transversely, or longitudinally across the entire width of the section or gore, thus imparting to the latter sufficient firmness to preserve its shape under all ordinary circumstances, without preventing it from yielding under excessive pressure, while the elasticity of the ribs will cause the corset to spring into shape after pressure is removed, the shortness and flexibility of the individual ribs permitting them to yield without breaking.

While portions of the corset may be thus stiffened by short parallel, or nearly parallel, ribs in juxtaposition, it is well to preserve the general outline by longer and shorter ribs, and this I do by forming pockets *c c*, extending from the lower edge upward to the breast-receptacles, and by forming longer pockets *c'*, extending the entire length of the corset at any desired point, either directly at the center of the breast-receptacles or between a central section and the side gores, as shown in Fig. 2 By this means the skeleton or frame is made sufficiently rigid, and the other portions stiffened without imparting undue rigidity to the corset at any one point.

In order to place the ribs in the position where they may act most effectively to stiffen the corset and to firmly secure them in place, as well as manufacture with greater facility than when the ribs are inserted in the pockets after uniting the cloth sections as usual, I form the sections separately with open pockets, insert the ribs in each section, and then sew the parts together without any other seams than are necessary to unite said parts, preferably by stitches passing completely through the cloth and through the bones at either end or both ends. When the bones lie loosely in the pockets, their ends, whenever the corset is bent, are thrust against the sides of the pockets, and in a short time perforate the latter. By sewing directly through the bones at either or both ends, each bone is confined in its position, its end cannot bear against the cloth, and it is held under such a tension that the elasticity and shape of the corset are preserved.

Difficulty has heretofore been experienced in securing properly the eyelets which fasten the suspension-hook C to the cloth body of the corset, the inner spread end of the eyelet not having sufficient hold on the cloth to adhere firmly thereto. I overcome this difficulty by passing the inner end of the eyelet *e*, Fig. 3, through a washer, *i*, and spreading the eyelet over the latter, preventing it from being drawn through the cloth.

It will be apparent that the string-eyelets may be similarly secured, both in corsets and other similar articles.

Without confining myself to the special form of corset or particular arrangements or disposition of ribs shown, I claim—

1. The improvement in the art of manufacturing corsets, consisting in forming pockets in the separate sections, inserting the ribs therein, and then uniting the sections, as set forth.

2. The within-described mode of securing the ribs or bones by stitches passing through the same and through the cloth.

3. A corset provided with ribs secured in position by stitches passing through the same, substantially as specified.

4. A bosom-pad corset in which the breast-receptacles are stiffened by series of diagonal and vertical ribs, as specified.

5. The combination of the ribs $c'$, extending the length of the corset, the shorter ribs $c$ $c$, extending from the lower edge to the breast-sections, and the series of small ribs stiffening the breast-sections, substantially as specified.

In testimony whereof I have signed my name to this specification in the presence of two subscribing witnesses.

IRA DE VER WARNER.

Witnesses:

T. R. CRUTTENDEN,

G. A. STAPLES.